United States Patent [19]
Nakagawa

[11] Patent Number: 5,375,364
[45] Date of Patent: Dec. 27, 1994

[54] FISHING ROD

[75] Inventor: Masayuki Nakagawa, Tokyo, Japan

[73] Assignee: Daiwa Seiko, Inc., Tokyo, Japan

[21] Appl. No.: 91,056

[22] Filed: Jul. 14, 1993

[30] Foreign Application Priority Data

Jul. 16, 1992 [JP] Japan .................. 4-055833[U]

[51] Int. Cl.5 .......................................... A01K 87/00
[52] U.S. Cl. ................................................ 43/18.1
[58] Field of Search ............... 43/18.1, 18.5, 20, 22, 43/23, 24, 25

[56] References Cited

U.S. PATENT DOCUMENTS

| | | |
|---|---|---|
| 2,180,323 | 11/1939 | Maxwell . |
| 4,519,159 | 5/1985 | Fazio .................... 43/25 |
| 4,621,447 | 11/1986 | Rhodes ................. 43/18.1 |
| 4,738,046 | 4/1988 | Fraylick et al. ...... 43/18.1 |
| 4,860,483 | 8/1989 | Hlad ..................... 43/18.1 |
| 4,870,774 | 10/1989 | Yamato . | 
| 5,172,508 | 12/1992 | Schmidt et al. ...... 43/18.1 |
| 5,231,782 | 8/1993 | Testa ................... 43/18.1 |

FOREIGN PATENT DOCUMENTS

| | | |
|---|---|---|
| 63-107167 | 7/1988 | Japan . |
| 2-177840 | 7/1990 | Japan . |
| 3-102845 | 10/1991 | Japan . |

*Primary Examiner*—P. Austin Bradley
*Assistant Examiner*—Chuck Y. Mah
*Attorney, Agent, or Firm*—Longacre & White

[57] ABSTRACT

A fishing rod includes a reel rest whose top has a reel foot mounting portion, and a grip located in front of the rest, and having a front portion and a thumb contact part which defines a flat top surface having a sufficiently lower height that the top of the front portion. When a fisherman uses the fishing rod while gasping the grip with his hand, a fishline is kept from coming into contact with the thumb of the hand or the portion thereof, which adjoins the thumb.

12 Claims, 2 Drawing Sheets

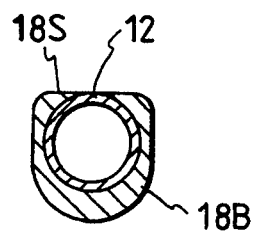 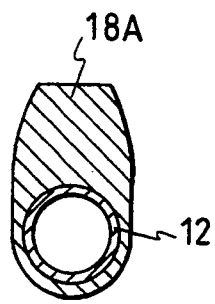 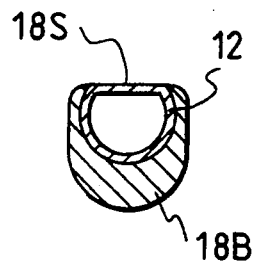
FIG. 3  FIG. 4  FIG. 5
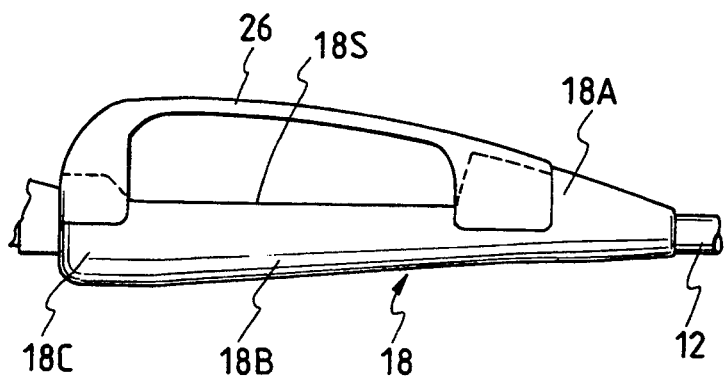
FIG. 6

FISHING ROD

BACKGROUND OF THE INVENTION

The present invention relates to a fishing rod, particularly to the form of the grip of a fishing rod, on the top of which a reel is mounted.

A conventional fishing rod, on the top of which a reel is mounted, is discloses, for instance, in the Japan Patent Application (OPI) No. 177840/90 (the term "OPI" as used herein means an "unexamined published application"). A fishline being unwound from the reel is guided by fishline guides on the top of the rod so that the fishline is moved to the tip of the rod.

There is an enough distance between the fishline and the top of the grip of the conventional fishing rod in front of the reel rest thereof before a fish is hooked. However, when a heavy fish is hooked, the fishing rod is flexed downward to decrease the distance between the fishline and the top of the grip so that the fishline comes into contact with a hand grasping the grip, and therefore becomes likely to injure the hand's thumb or portion adjoining the thumb or burn the thumb or the portion if the fishline is quickly moving. Besides, even if no fish is hooked, the fishline sometimes comes into contact with the thumb of the hand to hinder the fishing person from concentrating on fishing. Although the grip is sometimes grasped by the hand with its thumb located off the side of the fishing rod to cope with these problems, it is difficult to manipulate the rod or apply an enough holding force thereto if the grip is grasped by the hand in that manner.

SUMMARY OF THE INVENTION

The present invention was made in order to solve the above-mentioned problems. Accordingly, it is an object of the present invention to provide a fishing rod having a grip which is grasped by a hand in front of a reel rest of the rod so that a fishline is kept from coming into contact with the thumb of the hand or the portion thereof, which adjoins the thumb.

The fishing rod is characterized by including the reel rest whose top has a reel foot mounting portion; and the grip located in front of the rest, and having a front portion and a thumb contact part which is the top of another portion of the grip and extends below the top of the front portion.

The thumb of the hand grasping the grip of the fishing rod provided in accordance with the present invention is disposed within a space defined between the top of the front portion of the grip and the thumb contact part thereof so that the thumb is located sufficiently or slightly lower than a fishline extending over the grip. Thus, the fishline is prevented from coming into contact with the thumb of the hand grasping the grip even when the rod is bent or flextured. A cover may be provided over the thumb contact part so as to keep the fishline form coming into contact with the thumb of the hand grasping the grip.

BRIEF DESCRIPTION OF THE DRAWINGS

In the accompanying drawings:

FIG. 3 is a cross-sectional view of the part along lines A—A shown in FIG. 1;

FIG. 4 is a cross-sectional view of the part along lines B—B shown in FIG. 1;

FIG. 5 is a cross-sectional view of a major part of fishing rod which is a modification of the embodiment; and FIG. 6 is a side view of a major part of a fishing rod which is another modification of the embodiment.

DETAILED DESCRIPTION OF THE PREFERRED EMBODIMENTS

Figure 1:
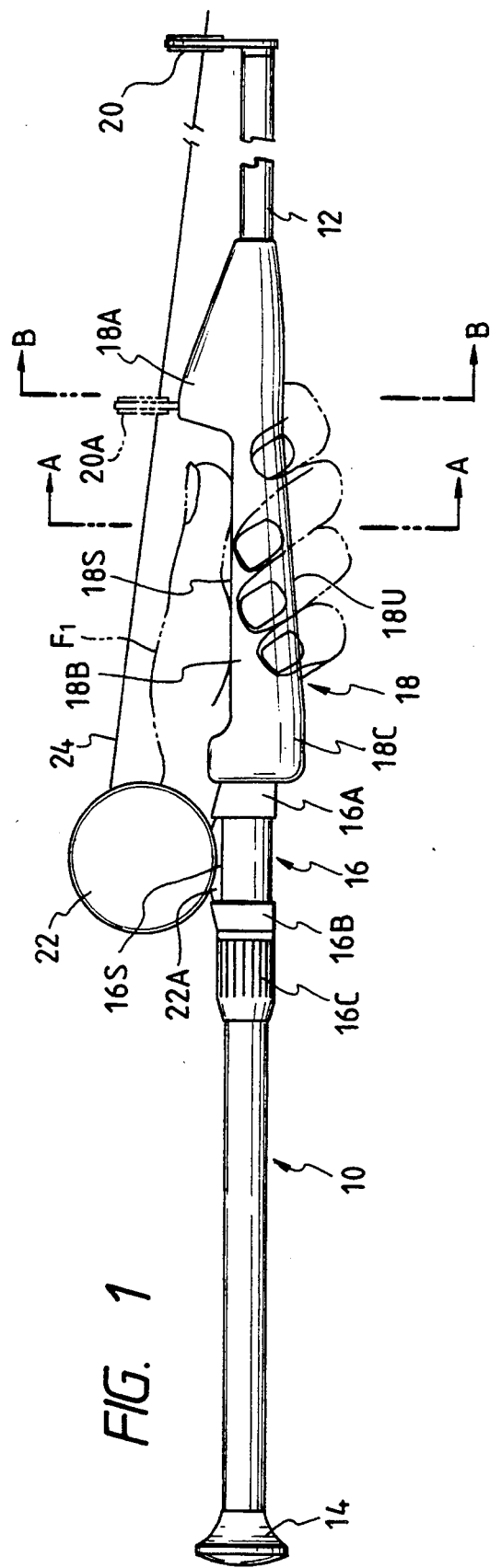
FIG. 1 is a side view of a major part of a fishing rod which is an embodiment of the present invention.
Figure 2:
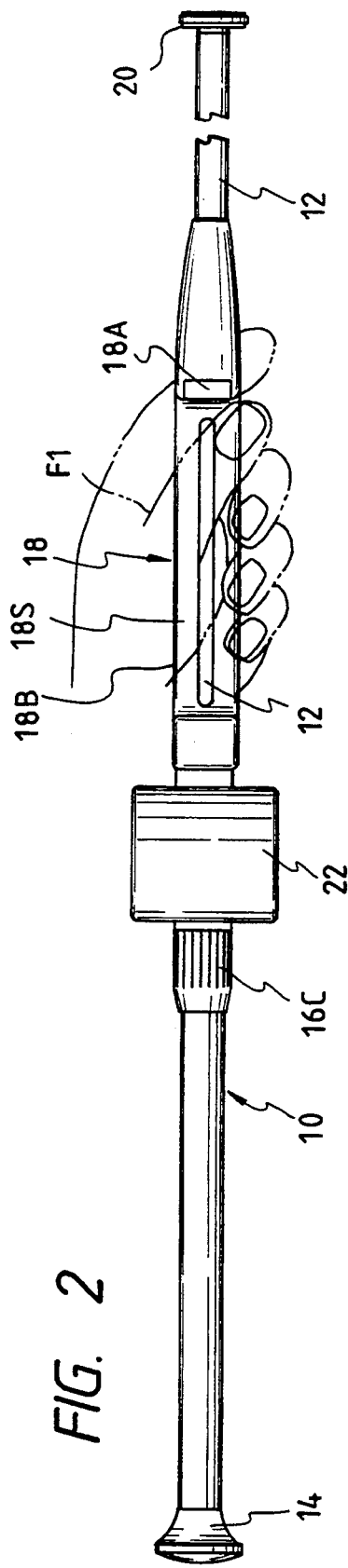
FIG. 2 is a plan view of the part.

Preferred embodiments of the present invention are hereafter described with reference to the drawings attached hereto.

FIGS. 1–4 show a fishing rod according to an embodiment of the present invention. The fishing rod includes a posterior member 10, a tubular member 12, a butt member 14, a reel rest 16, a grip 18, and a fishline guide 20.

The posterior member 10 and the tubular member 12 are usually formed of a one-piece tube, but the invention should not be restricted thereto or thereby.

The butt member 14 is fastened to the posterior member 10 at the rear end thereof. The reel rest 16 is provided on the posterior member 10 at the front end portion thereof, and has a reel foot mounting portion 16S, on which a foot 22A of a reel 22 is mounted so that the reel is located on the top or upper side of the posterior member 10. The grip 18 is provided on the tubular member 12 in front of the reel rest 16. The fishline guide 20 is mounted on the tubular member 12, and extends therefrom upwardly.

The reel rest 16 includes a fixed front mounting portion 16A, a movable rear mounting portion 16B, and a nut 16C for securing the movable rear mounting portion. A fishline 24 extending from the reel 22 whose foot 22A is fixed to the reel leg mounting portion 16S is laid through the fishline guide 20.

The grip 18 includes a front portion 18A of large height, an intermediate portion 18B, and a rear portion 18C. Since the top 18S of the intermediate portion 18B is flat and lowered in comparison with that of the front portion 18A, the thumb of a hand grasping the intermediate portion 18B of the grip 18 and the portion F1 of the hand, which adjoins the thumb, are located at a relatively large distance down from the fishline 24 so that even if the fishing rod is much flexed downward due to the hooking of a heavy fish, the fishline comes into contact with the top of the front portion 18A of the grip 18 not to descend from the top of the front portion 18A and come into contact with the thumb and the portion adjoining it. The bottom 18U of the intermediate portion 18B of the grip 18 extends obliquely down rearward. That is thickness of the intermediate portion 18B between the top 18S and the bottom 18U is gradually increased toward the rear portion 18C with the top 18S kept horizontally. Thus, when the intermediate portion 18B of the grip is grasped with a hand, the thumb and adjoining portion F1 of the hand naturally extend nearly horizontally. Accordingly, the fishline 24 is surely prevented from coming into contact with either of the thumb and the adjoining portion even when the fishing rod is flexed downward. Since the tubular member 12 is exposed in the top 18S of the grip 18 as best shown in FIG. 3, the lower surfaces of the thumb and adjoining portion F1 of the hand grasping the intermediate portion 18B of the grip are put in direct contact with the exposed portion of the tubular member so that the fishing person can surely feel the bite of a fish.

FIG. 5 is a cross-sectional view of a major part of a fishing rod which is a modification of the embodiment, the major part corresponding in location to that shown in FIG. 3. The difference of the rod from the embodiment shown in FIGS. 1–4 is that the top of a tubular member 12 is flattened to decrease the height thereof to make a fishline surer not to come into contact with the thumb and adjoining portion of a hand grasping the intermediate portion 18B of a grip.

In each of the fishing rods shown in FIGS. 1, 2, 3, 4 and 5, the top 18S of the intermediate portion 18B of the grip 18 is located so much below the top of the front portion 18A of the grip and the fishline 24 extending between the reel 22 and the front portion of the grip that the fishline does not come into contact with the thumb and adjoining portion F1 of the hand grasping the intermediate portion of the grip.

In each of fishing rods disclosed in the Japan Utility Model Applications (OPI) Nos. 107167/88 and 102845/91, the top of a grip is only flattened. In the rod disclosed in the Application (OPI) No. 107167/88, the top of the grip is flattened so that a fishing person can hold down a fishline against the flatted top by his thumb in sending the fishline forth. In the rod disclosed in the Application (OPI) No. 102845/91, the top of the grip is flattened in order to make it comfortable to grasp the grip. Therefore, the fishing rods essentially differ from the embodiment.

FIG. 6 is a side view of a major part of a fishing rod which is another modification of the embodiment. As similarly to the former embodiment, a grip 18 includes a front portion 18A, an intermediate portion 18B, and a rear portion 18C. The difference of the rod from the former embodiment is that a cover 26 is provided over a thumb contact part 18S of the intermediate portion 18B so as to define a space in which the thumb of a hand grasping the intermediate portion 18B and the portion of the hand, which adjoins the thumb, are put. Since a fishline comes into contact with the cover 26 at the time of downward flexing of the rod, the fishline is kept from coming into contact with the thumb and the portion adjoining it. Since the fishing person is thus freed from being anxious about the possible contact of the fishline with the hand grasping the intermediate portion 18B of the grip 18, he can concentrate on fishing with the rod. Since the fishline is likely to often come into contact with the cover 26, it is preferable that the top of the cover has no edge and is smooth so as to guide the fishline without causing any damage onto the fishline. The cover 26 may be removably fastened to the grip 8, and/or may extend over only a portion of the thumb contact part 18S.

The fishline guide 20 may be provided on the top of the front portion 18A of the grip 18 in the embodiment, as shown by a two-dot chain line 20A in FIG. 1, to make the fishline surer not to come into contact with the thumb and adjoining portion of the hand grasping the grip.

A fishing rod provided in accordance with the present invention includes a reel rest, and a grip located in front of the rest so as to be grasped by a hand. Since the top of the grip has a thumb contact part below the top of the front portion of the grip, a fishline does not come into contact with the thumb of the hand and the portion thereof, which adjoins the thumb. If the dimensions of the rod make it impossible to completely prevent the fishline from coming into contact with the thumb and the adjoining portion, a cover is provided over the thumb contact part to enable the complete prevention. Since the hand grasping the grip is thus protected from being injured by the fishline, fishing can be done with freedom from anxiety. Besides, since the thumb of the hand grasping the grip does not need to be located off the side of the fishing rod, an enough force can be applied by the hand to move the rod up and down.

What is claimed is:
1. A fishing rod, comprising:
   a first member extending in a longitudinal direction along a longitudinal axis and defining an upper side and a lower side opposite from said upper side, said upper side extending in a first direction substantially perpendicular to said longitudinal direction;
   a reel rest provided on said first member and having a reel foot mounting portion located in said upper side and adapted for mounting a reel onto said first member; and
   a grip provided on said first member and having a front portion defining a first top surface located in said upper side and an intermediate portion located between said front portion and said reel rest in said longitudinal direction and defining a second top surface located in said upper side, wherein a first maximum deviation of said first top surface from said longitudinal axis in said first direction is greater than a second maximum deviation of said second top surface from said longitudinal axis in said first direction, and wherein said second top surface is flattened and extends in a direction parallel to said longitudinal axis.
2. The rod according to claim 1, wherein said intermediate portion is adapted to be grasped by a user's hand in such a manner that a thumb of said user's hand is place on said second top surface.
3. The rod according to claim 1, further comprising:
   a fishline guide provided on said first member for guiding a fishline wound on said reel so that said fishline is laid over said grip in said upper side.
4. The rod according to claim 1, wherein said second top surface is flattened and extends in said longitudinal direction.
5. The rod according to claim 1, wherein a portion of said first member extends through a portion of said intermediate portion and projects beyond said second top surface in said first direction.
6. The rod according to claim 5, wherein said portion of said first member is flattened.
7. The rod according to claim 1, wherein said front portion and said intermediate portion are integrally molded as a one-piece member.
8. A fishing rod, comprising:
   a first member extending in a longitudinal direction along a longitudinal axis and defining an upper side and a lower side opposite from said upper side, said upper side extending in a first direction substantially perpendicular to said longitudinal direction;
   a fishline guide provided on said first member for guiding a fishline wound on said reel so that said fishline is laid over said grip in said upper side;
   a reel rest provided on said first member and having a reel foot mounting portion located in said upper side and adapted for mounting a reel onto said first member; and
   a grip provided on said first member and having a front portion defining a first top surface located in said upper side and an intermediate portion located between said front portion and said reel rest in said longitudinal direction and defining a second top surface located in said upper side, wherein a first maximum deviation of said first top surface from said longitudinal axis in said first direction is greater than a second maximum deviation of said second top surface from said longitudinal axis in said first direction, wherein said fishline guide is fixed on said first top surface.

9. A fishing rod, comprising:

a first member extending in a longitudinal direction along a longitudinal axis and defining an upper side and a lower side opposite from said upper side, said upper side extending in a first direction substantially perpendicular to said longitudinal direction;

a reel rest provided on said first member and having a reel foot mounting portion located in said upper side and adapted for mounting a reel onto said first member; and a grip provided on said first member and having a front portion defining a first top surface located in said upper side and an intermediate portion located between said front portion and said reel rest in said longitudinal direction and defining a second top surface located in said upper side, wherein a first maximum deviation of said first top surface from said longitudinal axis in said first direction is greater than a second maximum deviation of said second top surface from said longitudinal axis in said first direction, wherein said grip further includes a rear portion located between said intermediate portion and said reel rest, and wherein said rod further comprises:

a cover for connecting said rear portion and said front portion while extending over said intermediate portion to define a space therebetween.

10. A fishing rod comprising:

a rod main body;

a reel rest provided on said rod main body for mounting a reel onto said rod main body;

a plurality of guide rings provided on said rod main body for guiding a fishline in a longitudinal direction of said rod main body, said guide rings extending in a first direction perpendicular to said longitudinal direction;

a grip located between said reel rest and nearest one of said guide rings, which is located the nearest to said reel rest among said guide rings, and adapted to be grasped by a user's hand, said grip extending in said longitudinal direction; and means for preventing said fishline extending between said reel and said nearest guide ring from coming into contact with said user's hand grasping said grip when said rod main body is bent.

11. The rod according to claim 10, wherein said grip comprises a front portion defining a front top surface and said means comprises a recessed portion disposed on said grip, said recessed portion located between said front portion and said reel rest to define a gripping surface having a reduced height in said first direction with respect to said front top surface.

12. The rod according to claim 10, wherein said means comprises a cover extending over at least a portion of said grip to define a space therebetween.

* * * * *